(12) United States Patent
Woodfield et al.

(10) Patent No.: US 9,079,164 B2
(45) Date of Patent: Jul. 14, 2015

(54) SINGLE REACTION SYNTHESIS OF TEXTURIZED CATALYSTS

(71) Applicant: Brigham Young University, Provo, UT (US)

(72) Inventors: Brian F. Woodfield, Provo, UT (US); Stacey Smith, Provo, UT (US); David Selck, Provo, UT (US); Calvin H. Bartholomew, Orem, UT (US); Xuchu Ma, Orem, UT (US); Fen Xu, Orem, UT (US); Rebecca E. Olsen, Provo, UT (US); Lynn Astle, Provo, UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 13/836,985

(22) Filed: Mar. 15, 2013

(65) Prior Publication Data

US 2013/0267411 A1      Oct. 10, 2013

Related U.S. Application Data

(60) Provisional application No. 61/615,747, filed on Mar. 26, 2012.

(51) Int. Cl.
*B01J 21/00* (2006.01)
*B01J 23/00* (2006.01)
(Continued)

(52) U.S. Cl.
CPC  *B01J 23/83* (2013.01); *B01J 21/04* (2013.01); *B01J 21/063* (2013.01); *B01J 23/42* (2013.01); *B01J 23/44* (2013.01); *B01J 23/63* (2013.01); *B01J 23/745* (2013.01); *B01J 23/78* (2013.01); *B01J 35/002* (2013.01); *B01J 35/006* (2013.01); *B01J 35/0033* (2013.01); *B01J 35/1019* (2013.01); *B01J 35/1038* (2013.01); *B01J 35/1042* (2013.01); *B01J 35/1061* (2013.01); *B01J 37/0236* (2013.01); *B01J 37/03* (2013.01); *B01J 37/04* (2013.01); *C10G 2/33* (2013.01); *C10G 2/332* (2013.01)

(58) Field of Classification Search
USPC .......................... 502/303, 100, 102, 104, 107
See application file for complete search history.

(56) References Cited

U.S. PATENT DOCUMENTS 2,457,719 A    12/1948  Pine et al.
2,767,202 A    10/1956  Rottig
(Continued)

FOREIGN PATENT DOCUMENTS

AU         758256       3/2003
AU       2005203123     2/2006
(Continued)

OTHER PUBLICATIONS

U.S. Appl. No. 11/707,840, filed Feb. 16, 2007, Brian F. Woodfield et al.
(Continued)

*Primary Examiner* — James McDonough
(74) *Attorney, Agent, or Firm* — Workman Nydegger

(57) ABSTRACT

Methods are described for making a texturized catalyst. The textural promoter may be a high-surface area, high-porosity, stable metal oxide support. The catalyst is manufactured by reacting catalyst precursor materials and support materials in a single, solvent deficient reaction to form a catalyst. The catalyst may be particles or a coating or partial coating of a support surface.

21 Claims, 3 Drawing Sheets

3 wt% Palladium Nanoparticles (1.3 ± 0.2 nm) On La-Alumina

(51) Int. Cl.

| | | |
|---|---|---|
| *B01J 25/00* | (2006.01) | |
| *B01J 29/00* | (2006.01) | |
| *B01J 31/00* | (2006.01) | |
| *B01J 39/00* | (2006.01) | |
| *B01J 23/83* | (2006.01) | |
| *B01J 23/63* | (2006.01) | |
| *B01J 23/78* | (2006.01) | |
| *B01J 23/44* | (2006.01) | |
| *B01J 23/42* | (2006.01) | |
| *B01J 37/03* | (2006.01) | |
| *B01J 37/04* | (2006.01) | |
| *B01J 21/04* | (2006.01) | |
| *B01J 21/06* | (2006.01) | |
| *B01J 23/745* | (2006.01) | |
| *B01J 35/00* | (2006.01) | |
| *B01J 35/10* | (2006.01) | |
| *C10G 2/00* | (2006.01) | |
| *B01J 37/02* | (2006.01) | |

(56) References Cited

U.S. PATENT DOCUMENTS

| | | | |
|---|---|---|---|
| 2,786,817 A | 3/1957 | Rottig | |
| 3,260,679 A | 7/1966 | Wennerberg et al. | |
| 3,271,324 A | 9/1966 | Hirschler et al. | |
| 3,900,387 A * | 8/1975 | Wilhelm | 208/139 |
| 4,422,960 A | 12/1983 | Shiroto et al. | |
| 4,543,341 A | 9/1985 | Barringer et al. | |
| 4,622,308 A | 11/1986 | Koikeda et al. | |
| 4,622,311 A | 11/1986 | Wakui et al. | |
| 5,128,081 A | 7/1992 | Siegel et al. | |
| 5,227,407 A | 7/1993 | Kim | |
| 5,328,501 A * | 7/1994 | McCormick et al. | 75/352 |
| 5,358,695 A | 10/1994 | Helble et al. | |
| 5,397,758 A | 3/1995 | Bouruetaubertot et al. | |
| 5,417,956 A | 5/1995 | Moser | |
| 5,486,675 A | 1/1996 | Taylor et al. | |
| 5,698,483 A | 12/1997 | Ong et al. | |
| 5,927,621 A | 7/1999 | Ziolo et al. | |
| 5,958,361 A | 9/1999 | Laine et al. | |
| 6,027,706 A | 2/2000 | Pinnavaia et al. | |
| 6,066,305 A | 5/2000 | Dugger et al. | |
| 6,203,768 B1 | 3/2001 | McCormick et al. | |
| 6,468,497 B1 | 10/2002 | Khan et al. | |
| 6,503,475 B1 | 1/2003 | McCormick et al. | |
| 6,506,493 B1 | 1/2003 | Kumar et al. | |
| 6,558,847 B1 | 5/2003 | Kawakami et al. | |
| 6,558,884 B1 | 5/2003 | Greener et al. | |
| 6,600,127 B1 | 7/2003 | Peterson et al. | |
| 6,620,351 B2 | 9/2003 | Gupta et al. | |
| 6,749,648 B1 * | 6/2004 | Kumar et al. | 29/623.1 |
| 6,749,966 B2 | 6/2004 | Reitz et al. | |
| 6,777,639 B2 | 8/2004 | Schroder et al. | |
| 6,803,027 B1 | 10/2004 | Virkar et al. | |
| 6,962,946 B2 | 11/2005 | Brady et al. | |
| 7,049,347 B2 | 5/2006 | Hu | |
| 7,060,473 B2 | 6/2006 | Phelps et al. | |
| 7,066,977 B2 | 6/2006 | Huang | |
| 7,081,267 B2 | 7/2006 | Yadav | |
| 7,087,100 B2 | 8/2006 | Lewis et al. | |
| 7,105,145 B2 | 9/2006 | Seol et al. | |
| 7,118,727 B2 | 10/2006 | Williams | |
| 7,163,963 B2 | 1/2007 | Fraenkel | |
| 7,259,286 B2 * | 8/2007 | Jothimurugesan et al. | 585/638 |
| 8,211,388 B2 | 7/2012 | Woodfield et al. | |
| 8,216,963 B2 | 7/2012 | Kibby et al. | |
| 2002/0028745 A1 | 3/2002 | Krylova et al. | |
| 2002/0110517 A1 | 8/2002 | James et al. | |
| 2002/0187889 A1 | 12/2002 | Lauf et al. | |
| 2003/0019328 A1 | 1/2003 | Dunmead et al. | |
| 2003/0032192 A1 | 2/2003 | Haubold et al. | |
| 2003/0051580 A1 | 3/2003 | Lewis et al. | |
| 2003/0102099 A1 | 6/2003 | Yadav et al. | |
| 2003/0124043 A1 | 7/2003 | Yadav et al. | |
| 2003/0126948 A1 | 7/2003 | Yadav et al. | |
| 2003/0138368 A1 | 7/2003 | Yadav et al. | |
| 2003/0180213 A1 | 9/2003 | Carnes et al. | |
| 2004/0005485 A1 | 1/2004 | Yadav et al. | |
| 2004/0009118 A1 | 1/2004 | Phillips et al. | |
| 2004/0086452 A1 | 5/2004 | Seol et al. | |
| 2004/0108220 A1 | 6/2004 | Stephan et al. | |
| 2004/0120884 A1 | 6/2004 | Sherman | |
| 2004/0122115 A1 * | 6/2004 | Espinoza et al. | 518/721 |
| 2004/0178530 A1 | 9/2004 | Yadav | |
| 2004/0231464 A1 | 11/2004 | Kurihara et al. | |
| 2005/0031517 A1 | 2/2005 | Chan | |
| 2005/0053538 A1 | 3/2005 | Holloway et al. | |
| 2005/0063889 A9 | 3/2005 | Yadav et al. | |
| 2005/0063898 A1 | 3/2005 | Ja Chisholm | |
| 2005/0119398 A1 | 6/2005 | Zhang | |
| 2005/0191492 A1 | 9/2005 | Yadav | |
| 2005/0214916 A1 | 9/2005 | Absar et al. | |
| 2005/0228202 A1 | 10/2005 | Nappa et al. | |
| 2005/0260122 A1 | 11/2005 | Li et al. | |
| 2005/0271566 A1 | 12/2005 | Yadav | |
| 2006/0084278 A1 | 4/2006 | Winter et al. | |
| 2006/0110314 A1 | 5/2006 | Torardi | |
| 2006/0115411 A1 | 6/2006 | Jensen et al. | |
| 2008/0032132 A1 | 2/2008 | Woodfield et al. | |
| 2009/0023581 A1 | 1/2009 | DiMonte et al. | |
| 2009/0036558 A1 | 2/2009 | Font Freide et al. | |
| 2010/0174002 A1 * | 7/2010 | Kibby et al. | 518/715 |
| 2011/0257008 A1 | 10/2011 | Bartholomew et al. | |

FOREIGN PATENT DOCUMENTS

| | | |
|---|---|---|
| CN | 1184703 | 6/1998 |
| CN | 1477059 | 2/2004 |
| CN | 1478724 | 3/2004 |
| CN | 1660530 | 8/2005 |
| CN | 101384511 | 3/2009 |
| DE | 10163399 | 7/2003 |
| DE | 102004016131 | 10/2005 |
| EP | 0735001 | 10/1996 |
| EP | 1894626 | 3/2008 |
| JP | 2003-034526 | 2/2003 |
| JP | 2003-267704 | 9/2003 |
| JP | 2005-263615 | 9/2005 |
| JP | 2005-336019 | 12/2005 |
| JP | 2006-16236 | 1/2006 |
| JP | 2009-527365 | 7/2009 |
| WO | WO 00/24676 | 5/2000 |
| WO | WO 02/055240 | 7/2002 |
| WO | WO 02/060623 | 8/2002 |
| WO | WO 03/014011 | 2/2003 |
| WO | WO 03/031323 | 4/2003 |
| WO | WO 03/076338 | 9/2003 |
| WO | WO 2004/007357 | 1/2004 |
| WO | WO 2004/092069 | 10/2004 |
| WO | WO 2005/026045 | 3/2005 |
| WO | WO 2005/060610 | 7/2005 |
| WO | WO 2005/077505 | 8/2005 |
| WO | WO 2005/080271 | 9/2005 |
| WO | WO 2005/118465 | 12/2005 |
| WO | WO 2006/000049 | 1/2006 |
| WO | WO 2007/098111 | 8/2007 |

OTHER PUBLICATIONS

U.S. Appl. No. 13/069,317, filed Mar. 22, 2011, Calvin H. Bartholomew et al.

U.S. Appl. No. 13/836,850, filed Mar. 15, 2013, Brian F. Woodfield et al.

Lin, Y. et al., "Preparation of Nanometers Zinc Oxide Powders by Plasma Pyrolysis Technology and Their Applications", J. Am. Cream. Soc., vol. 83(11), pp. 2869-2871, (2000).

Sun, Ya-Ping et al., Preparation of Nickel, Cobalt, and Iron Nanoparticles Through the Rapid Expansion of Supercritical Fluid Solutions, (RESS) and Chemical Reduction, Chemistry of Materials, Jan. 1999, pp. 7-9, vol. 11, No. 1, American Chemical Society, Washington, US.

(56) References Cited

OTHER PUBLICATIONS

Liu, Yan-Li et al, Simple synthesis of MgFe$_2$O$_4$ nanoparticles and gas sensing materials, Sensors and Actuators B, Jun. 29, 2005, pp. 600-604, vol. 107, No. 2, Elsevier.
PCT Application No. PCT/US2007/004279, International Search Report and the Written Opinion of the International Searching Authority, Mailed Sep. 11, 2007.
International National Search Report for PCT/US2011/029472 dated Nov. 28, 2011.
Wang, J. et al., Synthesis and characterization of ZnO nanoparticles assembled in one-dimensional order, Inorganic Chemistry Communications, vol. 6 877-881 (2003).
Li, Z., et al., Non-isothermal kinetics studies on the thermal decomposition of zinc hydroxide carbonate, Thermochimica Acta, vol. 438, 102-106 (2005).
Lin, et al. "Characterisation of ZnO-based Varistors Prepared from Nanometre Precursor Powders", Advanced Materials for Optics and Electronics, Adv. Mater. Opt. Electron. 9, pp. 205-209 (1999).
Matson, D. Wet al., Ultrafine Iron Oxide Powders generated using a flow-through hydrothermal process, Mater. Lett. 1992, pp. 222-226, vol. 14, No. 4.
Kang, Y.C. et al, Preparation of Nanometre size oxide particles using filter expansion aerosol generator, Journal of Materials Science, 1996, pp. 2409-2416, vol. 31, No. 9.
Choy, H. et al., Citrate Route to the Piezoelectroic Pb(Zr,Ti)O$_3$ Oxide, J. Mater Chem., 1997, pp. 1815-1820, vol. 7, No. 9.
Reverchon, E. et al, Supercritical antisolvent precipitation of nanoparticles of superconductor precursors, Industrial & Engineering Chemistry Research, 1998, pp. 952-958, vol. 37, No. 3.
Meulenkamp, E. A., Synthesis and growth of ZnO nanoparticles, Journal of Physical Chemistry B, Jul. 16, 1998, pp. 5566-5572. vol. 102, No. 29, ACS, USA.
Chicheng, MA et al, A New Combined Process for Production of Fine Alumina Powders, Engineering chemistry and metallurgy, vol. 20, No. 4, 1999. (English Abstract).
Mizukoshi, Y. et al., Preparation of platinum nanoparticles by sonochemical reduction of the Pt(II) Ion, Langmuir, pp. 2733-2737, Apr. 13, 1999, vol. 15, No. 8, American Chem. Soc., US.
Camargo, E. R. et al., Pyrochlore-free Pb(Mg$_{1/3}$Nb$_{2/3}$)O$_3$ prepared by a combination of the partial oxalate and the polymerized complex methods, Journal of Alloys and Compounds, Jan. 16, 2001, pp. 140-146, vol. 314, Elsevier, Switzerland.
Zhuang, Jia et al., Study on nanophase cobalt oxide (Co$_3$O$_4$) fabrication by a solid-state reaction at ambient temperatures, Journal of Inorganic Materials, pp. 1203-1206, vol. 16, No. 6, Nov. 2001. (English Abstract).
Zhang, Feng et al., Cerium oxide nanoparticles: Size-selective formation and structure analysis, American Institute of Physics, Jan. 7, 2002, pp. 127-129.vol. 80, No. 1.
Hao, Chen et al., The Technique for Preparing Nanometer Al$_2$O$_3$ Powder with Chemical Method, Materials for mechanical engineering, Jul. 2002, pp. 25-27, vol. 26, No. 7.
Liu, Jian-Ben et al, Preparation of Nanometer-Sized ZnO Particles by Gass-Solid Phase Reaction, Fine Chemical Intermediates, Oct. 2002, pp. 26-27, vol. 32, No. 5. (English Abstract).
Yang, Yang et al., ZnO nanoparticles prepared by thermal decomposition of beta-cyclodextrin coated zinc acetate, Chemical Physics Letters, May 13, 2003, pp. 22-27, vol. 373, No. 1-2, Elsevier, Netherlands.
Shen, Xiao-Qing et al, Preparation of nanosized alumia powders by pyrolysis of ammonium aluminum carbonate hydroxide, Chinese Journal of Inorganic Chemistry, Jun. 2003, pp. 650-654, vol. 19, No. 6. (English Abstract).
Sun, Xudong et al. Synthesis of Nanocrystalline α-Al$_2$O$_3$ Powders from Nanometric Ammonium Aluminum Carbonate Hydroxide, Journal of the American Ceramic Society—Sun et al., 2003, pp. 1321-1325, vol. 86, No. 8.
Makela, J.M. et al, Generation of metal and metal oxide nanoparticles by liquid flame spray process, Journal of Materials Science, Apr. 15, 2004, pp. 2783-2788, vol. 39, No. 8.

Yuan, Fangli et al., Preparation of zinc oxide nanoparticles coated with homogeneous Al$_2$O$_3$ layer, Materials of Science and Engineering, Oct. 28, 2004, pp. 55-60.
Li, Jiang et al., Effects of α-Al$_2$O$_3$ Seeds on the Phase Transformation and Microstructure of Alumina, Journal of Inorganic Materials, Nov. 2004, pp. 1293-1297, vol. 19, No. 6. (English Abstract).
Jha, R K et al., Synthesis of Bismuth Oxide Nanoparticles using Bismuth Nitrate and Urea, Ceramics International, 2005, pp. 495-497, vol. 31, No. 3, Elsevier Science Ltd., Oxford, UK.
Vale, Damaris et al., Production of Nanoparticles of Aluminum Oxide by Decomposition of Aerosols of Aluminum Nitrate Solution in a Flame, Transactions of the American Nuclear Society, 2005, pp. 352-353, vol. 92, American Nuclear Society, Inc., La Grange Park, IL, USA.
Patil, M M et al., Synthesis of Bismuth Oxide Nanoparticles at 100 C, Materials Letters, 2005, pp. 2523-2525, vol. 59, No. 19/20, Elsevier, BV, Amsterdam, Netherlands.
Tani, T. et al., Effects of solvent on powder characteristics of zinc oxide and magnesia prepared by flame spray pyrolysis, Nippon Seramikkusu Kyokai Gakujutsu Ronbunishi (Journal of Ceramic Society of Japan), 2005, pp. 255-258, vol. 113, No. 3, Nippon Seramikkusu Kyokai, Tokyo, Japan.
Niederberger, M. et al, Non-aqueous routes to crystalline metal oxides nanoparticles: Formation mechanisms and applications, Progress Solid State Chemistry, 2005, pp. 59-70, vol. 33, No. 2-4, Elsevier, UK.
Li, Feng et al., One-step solid-state reaction synthesis and gas sensing property of tin oxide nanoparticles, Sensors and Actuators B, Jan. 5, 2005, pp. 165-169, vol. 81, No. 2-3, Elsevier Sequoia S.A., Lausanne, CH.
Wang, Xiong et al., Optical and electrochemical properties of nanosized NiO via thermal decomposition of nickel oxalate nanofibres, Nanotechnology, Jan. 2005, pp. 37-39, vol. 16, No. 1.
Chen, Yixian et al., Preparation. and characterization of palladium colloidal nanoparticles by thermal decomposition of palladium acetate with microwave irradiation, Journal of Materials Science & Technology, Mar. 2005, pp. 187-190, vol. 21, No. 2, Editorial Board J. Mater. Sci. & Technol, China.
Dar, M A et al., Preparation and characterization of alpha-FeOOH and alpha-Fe$_2$O$_3$ by sol-gel method, Journal of Materials Science, Jun. 2005, pp. 3031-3034, vol. 40, No. 11, Kluwer, Norwell, MA, USA.
Nethravathi, C. et al., Ferrimagnetic nanogranular Co$_3$O$_4$ through solovothennal decomposition of colloidally dispersed monolayers of α-cobalt hydroxide, Journal of Physical Chemistry B, Jun. 16, 2005, pp. 11468-11472, vol. 109, No. 23.
Morales, J. et al., Synthesis and characterization of nanometric iron and iron-titanium oxides by mechanical milling: electrochemical properties as anodic materials in lithium cells, Journal of Electrochemical Society, Sep. 2005, pp. A1748-A1754, vol. 152, No. 9, Electrochem. Soc, USA.
Carja, G. et al., From the organized nanoparticles of copper and vanadium containing LDHs to the small nanoparticles of mixed oxides: A simple route, Mater. Lett (Netherlands), Oct. 2005, pp. 3078-3080, vol. 59, No. 24-25, Elsevier, Netherlands.
You-Cheng, Wu et al., Synthesis of Al$_2$O$_3$ nanopowders by electrical explosion of wires, High Power Laser and Particle Beams, Nov. 2005, pp. 1753-1756, vol. 17, No. 11, IEE, Nucl. Soc., China. (English Abstract).
Muller, A. et al., Polyol method for the preparation of nanosized Gd$_2$O$_3$, boehmite and other oxides, Materials Research Bulletin, Dec. 8, 2005, pp. 2153-2169, vol. 40, No. 12, Elsevier, USA.
Polarz, Sebastian et al., Molecular encoding at the nanoscale: From complex cubes to bimetallic oxides, Angewandte Chemie—International Edition, Dec. 9, 2005, pp. 7892-7896, vol. 44, No. 48.
Zhang, Maolin et al., Novel preparation of nanosized ZnO—SnO$_2$ with high photocatalytic activity by homogeneous co-precipitation method, Materials Letters, Dec. 2005, pp. 3641-3644, vol. 59, No. 28, Elsevier, Netherlands.
Callone, E. et al., Nanopowders of metallic oxides prepared by the hydrolytic route with starch stabilization and biological abetment, Journal of Nanoscience and Nanotechnology, Jan. 2006, pp. 254-257, vol. 6, No. 1, American Scientific Publishers, USA.

(56) References Cited

OTHER PUBLICATIONS

Zhang, Yan Feng et al., Synthesis and characterization of $Ca_3Co_4O_9$ nanoparticles by citrate sol-gel method, Mater Lett, Sep. 2006, pp. 2443-2446, vol. 60, No. 20.

Shao, Huiping et al., Cobalt nanoparticles synthesis from $Co(CH_3COO)_2$ by thermal decomposition, Journal of Magnetism and Magnetic Materials, Sep. 2006, pp. e28-e30, vol. 304, No. 1.

Vasylkiv, Oleg et al, Nonisothermal synthesis of yttria-stabilized zirconia nanopowder through oxalate processing. I—Characteristics of Y—Zr oxalate synthesis and its decomposition, American Ceramic Society, Sep. 2000, pp. 2196-2002, vol. 83, No. 9.

Xu, J.L. et al, RF induction plasma synthesized calcium phosphate nanoparticles, Key Engineering Materials, vols. 309-311, May 2006, pp. 511-514, Trans Tech Publications, Switzerland.

Tsuzuki, Takuya et al., ZnO Nanoparticles Synthesised by Mechanochemical Process, Scripta Materialia, 2001, pp. 1731-1734, vol. 44, Nos. 8/9.

Wostek-Wojiciechowska, Dorota, et al., The solid-state synthesis of metal nanoparticles from organometallic precursors, Journal of Colloid and Interface Science, Jul. 1, 2005, pp. 107-113, vol. 287, No. 1, Academic Press, New York, NY, USA.

Zhijian, Wang, et al, Low-temperature synthesis of ZnO nanoparticles by solid-stae pyrolytic reaction, Nanotechnology, Jan. 1, 2003, pp. 11-15, vol. 14, No. 1,10P, Bristol, GB.

U.S. Appl. No. 11/707,840, Nov. 27, 2009, Restriction Requirement.
U.S. Appl. No. 11/707,840, Apr. 1, 2010, Office Action.
U.S. Appl. No. 11/707,840, Oct. 14, 2010, Final Office Action.
U.S. Appl. No. 11/707,840, Jan. 27, 2011, Interview Summary.
U.S. Appl. No. 11/707,840, Jan. 27, 2011, Advisory Action.
U.S. Appl. No. 11/707,840, May 24, 2011, Office Action.
U.S. Appl. No. 11/707,840, Dec. 28, 2011, Final Office Action.
U.S. Appl. No. 11/707,840, Mar. 8, 2012, Notice of Allowance.
U.S. Appl. No. 14/201,538, filed Mar. 7, 2014, Maryam Khosravi-Mardkhe et al.
U.S. Appl. No. 13/069,317, May 15, 2014, Restriction Requirement.
U.S. Appl. No. 13/836,850, Jun. 9, 2014, Office Action.
U.S. Appl. No. 13/069,317, Jul. 31, 2014, Office Action.
U.S. Appl. No. 13/836,850, Oct. 24, 2014, Final Office Action.
U.S. Appl. No. 13/836,850, Dec. 22, 2014, Notice of Allowance.
Petrik, L. "The influence of cation, anion and water content on the rate of formation and pore size distribution of zeolite ASM-5," South African Journal of Science, vol. 105, pp. 251-257, 2009.
Orefice, et al. SOL-GEL Transition and Structional Evolution on Multicomponent Gels Derived from the Alumina—Silica System, Jul. 1996, Journal of SOL-GEL Science and Technology, 9, 239-249.
U.S. Appl. No. 13/069,317, Feb. 12, 2015, Final Office Action.
U.S. Appl. No. 14/201,538, Apr. 9, 2015, Office Action.
U.S. Appl. No. 13/836,850, Apr. 17, 2015, Notice of Allowance.

* cited by examiner 3 wt% Palladium Nanoparticles (1.3 ± 0.2 nm) On La-Alumina 3 wt% Platinium Nanoparticles (1.8 ± 0.4 nm) On La-Alumina Z-Contrast HRTEM Image Of Sample In Example 12.
Bright Spots Indicate Pt Particles Supported On Al-Modified $TiO_2$

SINGLE REACTION SYNTHESIS OF TEXTURIZED CATALYSTS

CROSS-REFERENCE TO RELATED APPLICATIONS

This application is a Utility of, and claims priority to and the benefit of, U.S. Provisional Application Ser. No. 61/615,747 filed on Mar. 26, 2012 and entitled SINGLE REACTION SYNTHESIS OF TEXTURIZED CATALYSTS," which application is hereby expressly incorporated herein by this reference in its entirety.

GOVERNMENT RIGHTS

This invention was made with government support under STTR Phase II grant No. IIP-0956628 awarded by the National Science Foundation. The government has certain rights in the invention.

BACKGROUND OF THE INVENTION

1. The Field of the Invention

The present invention relates to single-pot synthesis of texturized metal oxide catalysts, activation of these catalysts to metals, metal oxides, or metal carbides, and properties of these catalysts.

2. The Relevant Technology

While the synthesis, characterization, and exploitation of nanometer-sized catalytic materials has been practiced for many decades, the science and technology have in just the last 10-15 years greatly expanded in depth and breadth. The expanded exploration of new properties and uses for nanoscale metals and metal oxides is underway in a variety of disciplines, including chemistry, physics, material science, and engineering. Many new applications of nanoparticle technologies have been or will be soon commercialized, including new methods for synthesis of nanoparticle catalysts. Much of present-day catalyst technologies are relatively mature having been manufactured commercially on a large scale for over 100 years using increasingly more detailed, multistep, labor-intensive methods that enable sophisticated, multilayer catalysts to be made and ensure quality control. While this multi-step, labor-intensive approach is probably justified for production of highly sophisticated catalyst products, such as multilayer, washcoated monolithic catalysts used in auto emissions control, there is a clear need for a more economical and efficient art, i.e., simple 1 or 2-step methods for producing multi-component catalysts containing nanoparticles of uniform size and high-purity. Such catalysts might include supported or texturally promoted metal, mixed-metal (alloy), metal oxide, and mixed-metal oxide nanoparticles with improved properties and performance in diverse applicants.

The prior art for preparation of supported metal oxide, metal carbide, and metal catalysts typically involves deposition of the active component onto a catalyst support (also known as a textural promoter) by impregnation, adsorption, ion-exchange, or precipitation followed by washing, drying, heating (e.g., calcination), and activation, e.g., reduction in $H_2$ to form supported metals and in a $H_2$, CO mixture to form a carbide. Unsupported, texturally promoted oxide, metal, or carbide catalysts are typically prepared by precipitation of a complex high surface hydroxide, oxide or carbonate containing the active component followed by washing, drying, separate addition by impregnation of the precursor of textural promoter (textural stabilizer or texturizing agent), a second drying, calcination and activation. Catalyst systems with about 10-30% textural promoter are said to be "unsupported" and catalyst systems with more than 50% of a textural promoter are referred to as "supported". The term "textural promoter" or "texturized" is used herein to include materials such as, but not limited to, binders, stabilizers, carriers and supports. It should be mentioned that in the prior art the support or textural promoter is sometimes coprecipitated from its precursor salt with the active material. More typically, a highly porous ceramic textural promoter such as alumina, titania, silica, zirconia, or ceria, is first prepared by precipitation of the metal oxide precursor salt, calcined and formed into a structured material, e.g., spray-dried to form spheres, extruded into pellets or dip coated on to various matrix structures. The desired catalyst is then typically formed separately in a second step on the previously prepared support by impregnation, precipitation, or by chemical vapor deposition of volatile precursors of the catalytic phase inside the support pores, followed by calcination and activation of the catalytic materials by reduction, carbiding, or sulfiding. Details and principles of the prior art of catalyst preparation are found in books by Stiles and Koch [1995]; Bartholomew and Farrauto [2006], and Regalbuto [2007].

Examples of various supports and procedures for making supports are disclosed in U.S. Pat. Nos. 2,749,216; 2,796,326; 2,917,366; 3,019,080; 3,038,784; 3,042,696; 3,244,972; 3,419,352; 3,823,895; 3,898,322; 3,941,719; 3,944,658; 3,987,155; 4,154,812; 4,172,809; 4,175,118; 4,275,052; 4,387,085; 4,532,072; 4,579,729; 4,676,928; 5,455,019; 5,480,630; 5,593,654; 5,622,684; 5,863,515; 6,001,326; 6,027,706; 6,129,904; 6,555,496; 6,761,866; 6,764,672; 7,090,824; 7,163,963; 7,235,224; 7,341,976; 7,442,290; 7,534,415; and 7,807,605.

SUMMARY OF THE INVENTION

The present disclosure relates to texturally promoted nanoparticle catalysts and methods for making these catalysts. The method includes forming both the textural promoter (e.g., the support) and the metal material (e.g., a nanoparticle metal oxide) simultaneously in a single ("one-pot") reaction. The reagents may be added simultaneously or in various orders of addition so long as the reaction of the precursor materials is completed in a single reaction vessel prior to proceeding to the second step of the process.

The supported or texturally promoted catalysts are made from precursor materials that include precursor salts of the catalyst metal (i.e., salts which contain the metal atoms that form the catalytic phase) and precursor salts of the textural promoter (i.e., salts which contain the atoms that form the porous support or textural stabilizer), which precursor salts are reacted with a base in a solvent deficient mixture. Forming both the support or textural promoter and the metal oxide form of the catalyst from a single reaction mixture can greatly simplify the manufacturing process and may improve the quality of the texturally-promoted catalysts.

In one embodiment, a method for making a supported catalyst can include forming a solvent deficient precursor mixture by mixing together (i) one or more catalyst metal salts, (ii) one or more textural promoter metal salts, and (iii) one or more bases in solvent deficient environment. The catalytic metal ions react with the base ions in the solvent deficient precursor mixture to form pre-catalyst precursors (e.g., metal hydroxide/metal oxyhydroxide). The support metal ions react with the be ions in the solvent deficient precursor mixture to form a support material precursor (e.g., metal hydroxide/metal oxyhydroxide). In a second step these precursors are calcined (heated) and the mixture of the catalyst and support precursors generally segregate and crystallize as separate nanoparticle oxide phases, thus creating catalyst nano oxides dispersed largely within the pores of the porous support surface or at the interface of a textural stabilizing material.

The solvent deficient precursor mixture can be made from any number of dry powders, liquids, or fluids so long as the mixed precursor (in which the reaction occurs) is sufficiently deficient in solvent such that the catalytic metal ions, the support metal ions and the base ions are not completely solvated. The metal salts may be in the anhydrous or hydrated form. If only anhydrous salts are used, a small amount of water is added as a reagent to supply the OH moiety for the formation of an intermediate product. Water in small amounts facilitates mixing of the components, but not in sufficient amounts to solubilize them, thus typically forming a slurry, not a solution.

Surprisingly it has been found that the porous support and the catalytic nanoparticles can be generally be formed from the same precursor mixture. During the formation of the textural promoter, the catalytic nanoparticle oxides tend to disperse on the textural promoter surface rather than being incorporated into the body of the material. Without wishing to be bound by theory, it is opined that the separation of the phases during crystallization is probably due to differences in the surface energies of the two phases. Preventing incorporation of the catalyst metal oxides in the textural promoter metal oxides as a solid solution, can be favored by properly selecting the chemical properties of the catalyst metal and textural promoter metal salts in a desired ratio at desired process conditions (e.g., calcination temperature), and/or desired chemical and physical properties of the nanooxide products (e.g., tendency to form a solid solution with the textual promoter, particle size and/or surface energy).

The ratio of the different nanoparticles that form in the precursor mixture has been found to have a significant impact on which nanoparticles will become the textural promoter (support) material and which nanoparticles will become the pre-catalytic nanoparticles. Specifically, the nanoparticles in higher concentration will tend to form the porous support material and the nanoparticles in low concentration tend to form the textural promoted (supported) catalytic nanoparticles. The dispersity of different catalytic nanoparticles is selected by properly choosing the concentrations of metal precursor salts that will form the nanoparticles. In one embodiment, the molar ratio of the one or more catalyst metal salts to one or more textural promoter metal salts is in a range from 1:2 to 1:100, 1:3 to 1:50, or 1:4 to 1:33.

In addition to forming two different nanoparticles from the same precursor mixture, the present disclosure also describes methods and compositions for controlling the pore structure of the textural promoter material. Controlling the pore structure and specifically pore size of the textural promoter enables it to accommodate the particular catalytic nanoparticles. The methods described herein can be used to control the BET surface area, pore size, and/or pore volume of the porous, stable metal oxides being manufactured.

The pore structure of the textural promoter material can be controlled by various techniques, including, but not limited to, (i) properly selecting the anion of the metal salt, (ii) properly selecting the amount and chemistry of optional mixing fluids included in the solvent deficient precursor mixture, (iii) adding appropriately small amounts of templating agent or non-reacting, non-solvating reagents (e.g., small organic molecules) to the initial reaction mixture, (iv) doping or stabilizing the primary support metal oxide by the addition of amounts of one or more different, desired precursor metal salts to the initial reaction mixture, and (v) possibly rinsing the intermediate nanoparticles prior to calcination.

Catalyst composition, textural promoter material composition, pore structure, thermal/hydrothermal stability, and crystal phase can be selectively and precisely controlled by using the above techniques individually or in desired combinations. The ability to control separately the formation of the catalytic nanoparticle phase and the textural promoter material in a single reaction mixture, e.g., controlling crystallite size distribution of the catalytic phase and the pore structure of the support material, is highly advantageous for obtaining an optimal catalyst system.

DETAILED DESCRIPTION

Figure 1:
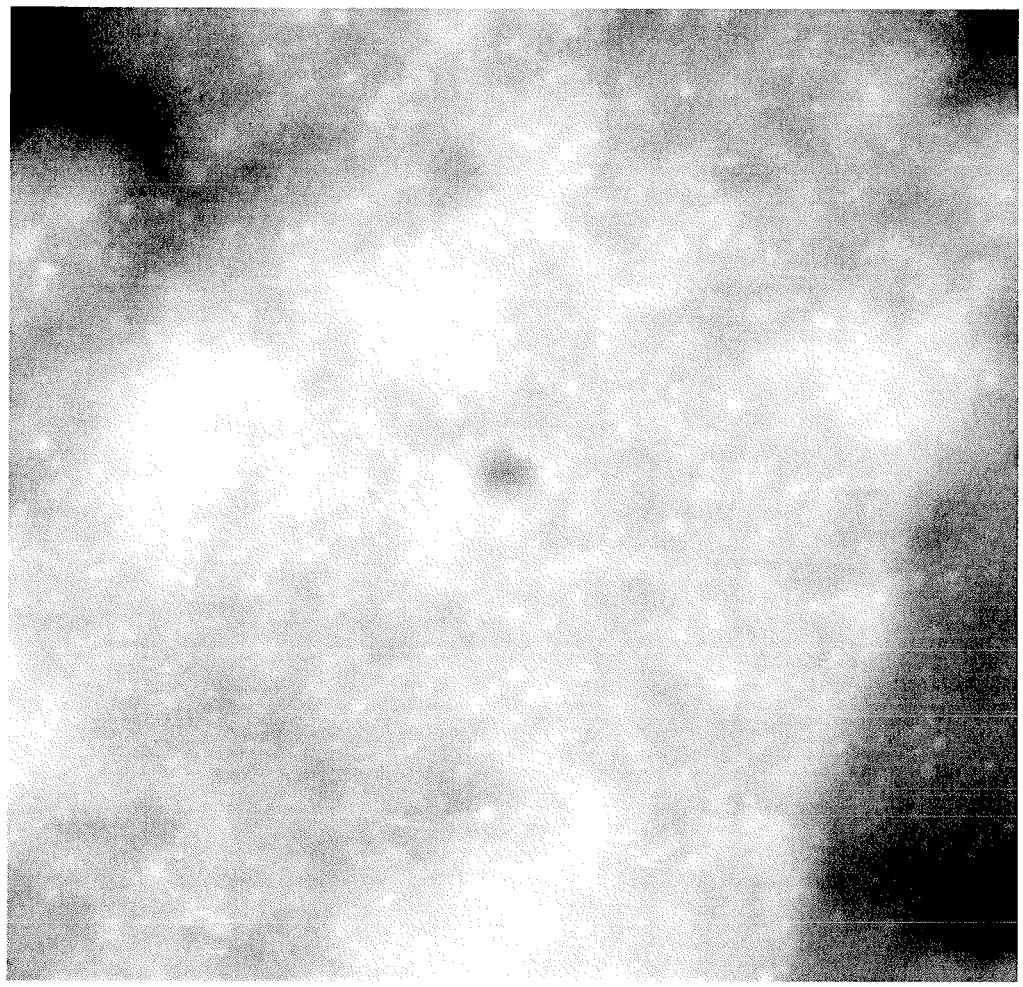
FIG. 1 is a Z-contrast Transmission Electron Microscopy (TEM) image of the catalyst sample prepared by the method described in Example 1. The lower electron density alumina appears as the somewhat fuzzy mass while noble metal nanoparticles stand out as bright dots.

The following descriptions and examples illustrate the preferred embodiments of the present invention in detail. Those skilled in the art will recognize that there are numerous variations and modifications of this invention that are encompassed by its scope. Accordingly, the description of the preferred embodiments should not be deemed to limit the scope of the present invention.

The present invention includes a single reaction (i.e., one-pot method) of preparing texturally promoted catalysts. The single reaction method is carried out by reacting precursor materials in a solvent deficient environment. The precursor materials include a mixture of catalyst metal salts, support metal salts and a base mixed simultaneously or sequentially. As an example of sequential mixing, an aluminum reagent such as an aluminum alkoxide may be mixed with a small amount of water which acts as a base and reactant to form an aluminum hydroxide/aluminum oxyhydroxide intermediate before addition of the other reactants. Or, all reactants may be mixed together simultaneously. The reaction of the precursor materials can form metal oxide nanoparticles (or crystallites) of the catalytic phase dispersed in the pores of a sintered porous support material or unsupported composite. Optionally the reacted precursor materials can be calcined to form the particles. Other components may be added to the initial reaction mixture or added to the same pot after the precursors are formed to incorporate additional desired properties to the final supported metal oxide catalyst product. Catalytic metal oxide nanoparticles (crystallites) can be reduced in flowing $H_2$ to produce a texturally-promoted metal/metal oxide composite. Similarly the metal oxide can be carbided in a $CO/H_2$ mixture or sulfided in an $H_2S/H_2$ mixture to produce catalytically active carbides or sulfides.

The metal of the catalyst metal salt can be any base metal (e.g., Co, Fe, Ni) or noble metal (e.g., Pt, Pd, Rh, Au, etc.) or mixtures thereof known to be active as a supported or texturally promoted metal, metal oxide, metal carbide, or metal sulfide catalyst efficient in catalyzing industrial reactions such as synthesis (e.g., Fischer-Tropsch), hydrogenation, oxidation, reforming, and pollution control reactions As used herein, the term "metal" is used broadly and means any element of the Periodic Table having potential for catalyzing reactions; except ions, hydrogen, boron, carbon, silicon, zirconium, nitrogen, phosphorus, arsenic, oxygen, sulfur, other Group VIA elements, fluorine, chlorine, bromine, iodine, helium, neon, argon, krypton, xenon and radon.

The metal of the catalyst metal salt may comprise an oxidation state of 0, +1, +2, +3, +4, +5, +6, +7 or +8. The metal salt may be in an anhydrous form or it may be in a hydrated form. In addition, the metal salt may be in a crystalline form or it may be in an amorphous form. In some embodiments, the catalyst metal salt may be a mixture of metal salts.

The term "salt" is defined broadly within the scope of the present invention as a compound comprising a metal cation bonded to an inorganic anion (e.g., $ZrCl_4$) or organic anionic species (e.g., cerium acetate or a titanium alkoxide). In general, salts are soluble in water but some salts are only measurably soluble at low or high pH.

Examples of catalyst metal salts include, but are not limited to, cobalt nitrate, cobalt oxalate, cobalt acetate, cobalt citrate, cobalt chloride, nickel nitrate, nickel sulfate, nickel oxalate, nickel acetate, copper nitrate, copper sulfate, copper oxalate, copper acetate, copper citrate, copper chloride, zinc nitrate, zinc phosphate, zinc oxalate, zinc acetate, zinc chloride, iron nitrate, iron oxalate, iron acetate, iron chloride, iron nitrate, iron oxalate, iron acetate, iron chloride, yttrium nitrate, yttrium acetate, yttrium chloride, yttrium citrate, neodymium nitrate, neodymium acetate, neodymium chloride, neodymium citrate, silver nitrate, silver acetate, silver phosphate, silver oxalate, silver chloride, tin nitrate, tin citrate, tin oxalate, tin chloride, lithium nitrate, lithium acetate, lithium chloride, lithium citrate, manganese nitrate, manganese chloride, manganese nitrate, manganese chloride, manganese oxalate, manganese phosphate, indium nitrate, indium chloride, indium acetate, indium citrate, indium oxalate, antimony nitrate, antimony phosphate, antimony acetate, cerium chloride, cerium citrate, gold nitrate, gold acetate, gold sulfate, gold chloride, iridium nitrate, iridium acetate, iridium oxalate, iridium chloride, magnesium nitrate, magnesium chloride, magnesium citrate, magnesium acetate, platinum chlorides, platinum cyanide, platinum amine chloride, platinum iodide, platinum bromide, palladium chlorides, palladium trifluoroacetate, ruthenium chloride, rhenium trichloride, rhenium pentachloride, and mixtures thereof. Preferred catalyst metal salts are often in the nitrate form.

Examples of textural promoter metal salts are those from four possible common metal systems which include but are not limited to: 1) aluminum: aluminum acetate, aluminum acetylacetonate, aluminum ammonium sulfate dodecahydrate, aluminum bromide, aluminum tert-butoxide, aluminum sec-butoxide, aluminum pentoxide, aluminum hexoxide, aluminum chloride, aluminum chloride THF complex, aluminum ethoxide, aluminum iodide, aluminum isopropoxide, aluminum L-lactate, aluminum metaphosphate, aluminum nitrate, aluminum perchlorate, aluminum phenoxide, aluminum phosphate, aluminum phthalocyanine chloride, aluminum sulfate, aluminum tributoxide, aluminum-tri-sec-butoxide, aluminum tris(2,2,6,6-tetramethyl-3,5-heptaneionate), (2) titanium: titanium(iv) bis(ammonium lactato)dihydroxide solution, titanium(iv) bis(ethyl acetoacetato) diisopropoxide, titanium(iv) bromide, titanium(iv) butoxide, titanium(iv) tert-butoxide, titanium(iv) hexoxide, titanium (iii) chloride, titanium(iv) chloride, titanium(iii) chloride tetrahydrofuran complex, titanium diisopropoxide bis(acetylacetonate), titanium(iv) diisopropoxidebis(2,2,6,6-tetramethyl-3,5-heptanedionate), titanium(iv) ethoxide, titanium(iv) 2-ethyl-1,3-hexanediolate, titanium(iv) iodide, titanium(iv) isopropoxide, titanium(iv) oxysulfate, titanium(iv) phthalocyanine dichloride, titanium(iv) propoxide, titanium(iii) sulfate, titanium(iv) (triethanolaminoato)isopropoxide, (3) zirconium: zirconium acetate, zirconium(iv) acetate hydroxide, zirconium(iv) acetylacetonate, zirconium(iv) bis(diethyl citrate) dipropoxide, zirconium(iv) tert-butoxide, zirconium(iv) hexoxide, zirconium(iv) butoxide solution, zirconium(iv) chloride, zirconium(iv) chloride tetrahydrofuran, zirconium (iv) diisopropoxidebis(2,2,6,6-tetramethyl-3,5-heptanedionate), zirconium(iv) ethoxide, zirconium(iv) hydrogenphosphate, zirconium(iv) iodide, zirconium(iv) isopropoxide isopropanol complex, zirconium(iv) propoxide, zirconium (iv) sulfate hydrate, zirconium tetrabis(2,2,6,6-tetramethyl-3, 5-heptanedionate), and (4) cerium: cerium(iii) acetate hydrate, cerium(iii) acetylacetonate hydrate, cerium(iii) bromide, cerium(iii) carbonate hydrate, cerium(iii) chloride, cerium(iii) 2-ethylhexanoate, cerium(iii) iodide, cerium(iii) nitrate hexahydrate, cerium(iii) oxalate hydrate, cerium(iii) perchlorate solution, cerium(iii) sulfate, cerium(iii) sulfate (hydrated), and cerium(iv) sulfate, (5)tetraethyl orthosilicate and mixtures thereof.

The base may comprise a compound that, when mixed with the metal salt, leads to partial or complete hydrolysis of the metal salts and provides counter-cations for the anion of both the catalyst metal salt and the support metal salt. The base may be in a solid form or it may be in a liquid form. Examples of a suitable base include, but are not limited to, ammonium carbonate, ammonium bicarbonate, ammonium sesquicarbonate, ammonium chloride, ammonium oxalate, ammonium sulfate, ammonium hydroxide, ammonium nitrate, lithium hydroxide, sodium hydroxide, potassium carbonate, potassium hydroxide, magnesium hydroxide, calcium hydroxide, and mixtures thereof. With some reactants such as some metal alkoxides, water is a sufficient base to initiate the reaction.

The metal salts and the base may be provided in various amounts and molar ratios. In certain embodiments, the molar ratio of the metal salts to base may be about 0.01, 0.1, 0.5, 1, 1.5, 2, 2.5, 3, 3.5, 4, 4.5, 5, 6, 7, 8, 9, or 10. In addition, the molar ratio of the metal salts to base can comprise a number in the range of any of the foregoing range of numbers to any of the other numbers in said range, including, but not limited to 0.01-5,1-4, 2-6, and 1-3.

The basic method of making texturally promoted catalyst materials of this invention includes mixing a dry powdered metal catalyst salt or salts, a dry powdered support or textural promoter metal salt or salts and a dry powdered base or bases in the absence of added solvent (but optionally in the presence of a small amount of water to facilitate mixing) to form a complex metal hydroxide/metal-oxide hydroxide precursor material and a byproduct salt. Alternatively, some starting materials such as titanium chloride are liquids at ambient temperatures and can be utilized in the same manner as the solid starting materials. The reaction is still solvent deficient and the reaction mixture consists of a solid suspension or slurry. If all of the starting materials are anhydrous an equimolar amount of water is added as a reactant to provide the hydroxide/oxide moiety. The precursor material, thus formed, is caused to be dehydrated by calcination to form crystalline metal oxide nanoparticles, and any byproducts such as the cation of the metal salt and/or base are decomposed or washed out.

Thus, in the one-pot reaction, a dry, hydrated, or anhydrous metal catalyst salt or salts and a textural promoted metal salt or salts are mixed with a base such as ammonium bicarbonate and waters of hydration are released. The subsequent reaction of the partly hydrated metal cations with the base leads to an intermediate precipitated metal hydroxide or metal oxide hydroxide and a byproduct salt combining the anion of the original metal salts and the cation of the base. Upon further stirring, the intermediate material may thicken to a slightly-wet solid depending upon the reagents used. The entire mixing process can be carried out within about, e.g., 1-30 minutes to bring the reaction to completion. An amount of water may be added as a reagent to provide the hydroxyl moiety if the reagents are anhydrous, or to facilitate mixing. However, a solvent deficient reaction environment is maintained in order to provide control over the formation of precursor crystal structures.

The intermediate hydrate/oxide product can be washed to remove the byproduct salts, or with certain compositions the byproduct salts can be removed by decomposition during the calcination step.

Optionally, the intermediate product can be dried at room temperature, or by heating at a temperature of 50° C., 80° C., or 100° C. or 120° C., or a range constructed from any of the foregoing temperatures. The drying time may range over a wide range of drying periods such as 1-250 hours, including any period with this range such as 1-24, 2-20 and 5-8 hours.

In a second step, the intermediate material is calcined to dehydrate the intermediate product to form the metal oxides. Without wishing to be limited by any theory, it is posited that as the different metal oxides nucleate and grow, they may typically form separate nano-scale crystallite phases of textural promoter and catalytic material due to differences in surface energy, crystal structure, and strength of oxide-oxide bonding. In the case of immiscible catalytic and support phases the catalytic species tends to form nanoparticles dispersed in the pores of the textural promoter. In some cases, metal oxides of the active phases and/or textural promoter may be miscible and will co-crystallize, while others will not. For example, in the production of a calcined alumina supported Fischer-Tropsch catalyst, iron and copper oxide phases, while largely immiscible due to differences in crystal structure, nevertheless co-crystallize to form nanoparticles on the surfaces of the porous aluminum oxide in which iron and copper oxides are closely associated. Potassium added in small amounts will (after calcination) reside as potassium oxide on the surfaces of iron, copper, and aluminum oxide crystallites.

In certain embodiments, the heating may be conducted under an oxidizing, inert, or reducing atmosphere. An oxidizing atmosphere may comprise an atmosphere such as air or oxygen. A reducing atmosphere may comprise an atmosphere comprising reducing reagents such as hydrogen gas or a synthesis gas (mixture of carbon monoxide and hydrogen gases). An inert atmosphere may comprise an atmosphere substantially free from oxidizing and reducing agents comprising, for example, argon, helium, nitrogen gas or a vacuum. Or the heating may be conducted under a combination of one or more such atmospheres.

The oxidation state of the resulting nanoparticles may be controlled by heating under an oxidizing, inert, or reducing atmosphere. For example, heating the intermediate material under an oxygen atmosphere may be used to yield high oxidation state metal oxide nanoparticles. Similarly, heating the precursor material under a hydrogen atmosphere may be used to yield metal nanoparticles in a zero oxidation state or metal oxides in a low oxidation state. Finally, heating the intermediate material under an inert atmosphere may be used to either maintain the starting oxidation state of the starting metal salts while nevertheless converting these salts to hydroxides or oxides or to initiate redox couples. As a consequence, the metal elements in the pre-catalyst compositions can be in oxidation states of 0 to 8 and may be in the form of metal oxides, mixed metal oxides, a single metal, mixed metals or combinations thereof. For example, the oxidation state of partial oxidation catalysts (typically mixed oxides—texturally promoted, but may be desirable. For Bi, Fe, Mo, V oxide catalysts, the active phase can be a unique oxidation state (e.g., V5+) which must be stabilized. From partial oxidations involving redox mechanisms, Mo or V the oxidation state may rapidly oscillate during reaction between two fixed states, e.g., from V5+ to V4+ and back.

When the intermediate is calcined in air or oxygen, the support nanoparticles form a solid, stable, porous metal oxide structure with aggregated, condensed, and/or sintered nanoparticles of unique shapes that self arrange to primary and secondary structures to form a desired pore structure. Calcination tends to produce highly connected, stable sintered or condensed metal oxides (e.g. transitional aluminas), especially at higher temperatures and long periods of time. The sintered metal oxide materials may be composed of alumina, titania, zirconia, other metal oxides, mixed metal oxides and solid solutions thereof. The calcination can be carried out at a temperature greater than 300° C., 350° C., or 400° C., and less than 1200° C., 800° C., 600° C., 400° C., or a range constructed from any of the foregoing temperatures. The calcination can be carried out for a period of time greater than 10 minutes to 30 minutes, 1 hour, 2 hours, 5 hours, 24 hours, 1 week, or any period within those stated. After the calcination process, the metal oxide pre-catalyst nanoparticles can be dispersed on the surface of the substrate textural promoted particles, or an amorphous surface coating may be formed. Thus, the method of this invention can be used to prepare a textural promoted (support) with the catalyst dispersed throughout the pores of the support in a convenient single-mixture process. In addition, the method of the invention may enable a wide variety of metal catalysts derived from the catalyst metal salts described above to be obtained as textural promoted catalyst components, the supported versions of which may be obtained on a wide variety of textural promoters derived from the metal salts of precursors described above.

In some embodiments, one or more components of the metal salt and/or the base may decompose to form gaseous byproducts during calcination. The method may also be modified by washing the precursor material prior to calcination to recover the byproduct salts and eliminate the gaseous decomposition of the byproducts during calcination.

The ratios of catalyst metal salt(s) to textural promoter metal salt(s) will depend on the proportions of catalyst metal material to support metal oxide material desired in the final supported catalyst. In some embodiments, the weight ratios of catalyst metal to textural promoter metal oxide in the final catalyst material will range from about 0.01%-99.9% by weight, including all sub-ranges and amounts within said range such as 1:2 to 1:99, 1:3 to 1:50 or 1:4 to 1:33. In general, when a noble metal salt is employed as the catalyst metal salt, the catalyst metal loading may range from about 0.05% to 5% by weight. When an iron or cobalt salt is employed to make what are termed in the art "supported" Fischer-Tropsch catalysts on alumina, silica, or titania (or mixtures thereof) textural promoter ("supported" catalysts, the range of iron or cobalt loading is about 10-30%, while for "unsupported" iron Fischer-Tropsch catalysts the typical amount of textural promoter (typically silica, alumina, or manganese oxide) is about 5 wt % to about 40 wt %. These ranges are approximate and meant to include all amounts and sub-ranges within those stated.

The solvent deficient method of the present invention can prepare highly porous, stable, nanoscale metal oxide textural promoter materials that can be customized to optimize their use as adsorbents and catalyst supports. Manipulations of the process and the substitution of various starting materials can be used individually or in combination to vary the porous structural characteristics (e.g., pore diameter, pore volume, surface area, etc.) over wide ranges to enable the production of catalyst textural promoters with the desired porous characteristics. These inventions are disclosed in Applicants co-pending U.S. patent application Ser. No. 13/069,317 filed Mar. 22, 2011, "Methods for making highly porous, stable metal oxides with a controlled pore structure", which application is hereby incorporated herein by reference in its entirety. These methods of producing controlled pore structures can be incorporated into the methods of the present invention to produce textural promoter catalysts in a single, one pot, in situ reaction with controlled pore structures. For example, a pore diameter of 3-4 nm may be optimal for preparing and stabilizing 1-2 nm crystallites of noble metal (e.g., Pt or Pd) nanoparticles while a pore diameter of 10-30 nm may be ideal for preparing and stabilizing a cobalt or iron based Fischer-Tropsch catalyst containing 6-10 nm metal or metal carbide (in the case of Fe) clusters. Combining the method of producing customized porous support structures with the process of the present one-pot invention will produce catalysts dispersed on the surfaces of textural promoter material with customized porous structures (such as a given average pore diameter) in a single, simplified process.

The present invention provides a convenient process for producing materials of stable nanoscale metal oxides of high-surface area and high mesoporosity suitable as adsorbents and catalysts textural promoter (supports), comprising stable mesoporous aluminas, titanias and other metal oxides, having dispersed thereon catalyst metal oxide, metal, metal carbide, or metal sulfide nanoparticles. In some embodiments, the process is carried out in such a way as to control the porous characteristics of the support metal oxides and to provide a process for making catalyst phases supported on stabilized mixed-metal-oxide supports, having improved thermal and hydrothermal stability as hereinafter described in a single process.

The metal catalyst and support metal oxide nanoparticles can have tight size distributions to enable the production of highly-uniform catalytic materials. The present invention produces highly connected, high surface area mesoporous metal oxide support material, and provides a means of manipulating the secondary structure or aggregation of the support nanoparticles to systematically control the surface properties and pore structure of the support materials as measured by the BET surface area, pore volume, pore size and pore size distribution. The pore structure of the metal oxide support materials can be controlled in the range from small micropores (3.5-10 nm diameter) to largemesopore sizes (20-55 nm diameter). Methods of producing thermally and hydrothermally-stable support metal oxide materials are also enabled.

The solvent deficient methods may produce unusually small diameternano crystallites (2-20 nm) of both the catalyst material and the support material which are characterized by sharp size distributions, i.e., as small as ±10%, ±20%, or ±50%. The metal oxide nanoparticles are, in general, highly crystalline with well-defined shapes (e.g., typically spheres, but sometimes plates or rods. These nanoparticle products may have high chemical and phase purities and the stable polymorphic phase for a given particle size is typically produced. In addition, the solid state, solvent-deficient reaction conditions and gaseous byproduct removal may yield highly pure materials with uniquely clean nanoparticle surfaces with less than a single layer of adsorbed water. Nano-metal oxide supports and pre-catalyst metal oxides can be prepared using salts of any of the catalyst and support salts previously mentioned in any stoichiometric combination thereof.

Additional details regarding methods for making the metal oxide components of the pre-catalysts of this invention in a solvent deficient environment and the reagents that can be used are disclosed in Applicants co-pending U.S. patent application Ser. No. 11/707,840, filed Feb. 16, 2007, now U.S. Pat. No. 8,211,388 which is hereby incorporated by reference in its entirety.

The process of this invention may include embodiments that produce specialized catalysts. For example, supported and unsupported Fischer-Tropsch catalysts can be prepared by employing suitable ingredients, including salts of the catalytic phase, promoters, textural stabilizers, and supports/binders in the initial reaction mixture. For example, in the case of Fe Fischer-Tropsch catalysts the mixture may contain metal salts of iron, copper and potassium, e.g., $Fe(NO_3)_3$, $Cu(NO_3)_2$ and $KHCO_3$, along with the textural stabilizer or support metal salt such as tetraethyl orthosilicate or aluminum isopropoxide. The aluminum or silicon salt may be added in various amounts depending on whether a "supported" or "unsupported" final catalyst product is desired. For example, an unsupported catalyst may be obtained by adding the aluminum or silicon salt in an amount to produce about 5-30 wt % alumina or silica in the final product. Or, a supported catalyst may be obtained by adding an amount of support salt(s) to produce 70-90 wt % alumina or silica in the final product. The precursor formed in the initial mixing step can be washed to remove the byproduct salts and then calcined, or calcined without washing at a temperature of, for example, 250-400° C., to decompose the byproduct salts, while forming the support oxide with the desired porous structure and crystallites of the catalytic oxide phase. This pre-catalyst may be subsequently reduced by in hydrogen gas at a temperature of, for example, 200-500° C. and (in the case of Fe Fischer-Tropsch catalysts) carbiding, in a mixture of hydrogen and carbon monoxide gases at a temperature of, for example, 230-300° C. Using the methods described herein, the pore size of the support can be matched for best results to the catalyst nanoparticle size.

To illustrate several embodiments of the preparation of Fischer-Tropsch catalysts, different variations of the "one pot" process described herein have been investigated. The initial reaction mixture contained the aforementioned salts of iron, copper and potassium and aluminum isopropoxide in an amount to produce either 10 wt % or 80 wt % alumina in the final catalyst material. The precursor was washed with sec-butanol to produce the desired 30 nm pore diameter, followed by calcination. The resulting supported oxide catalyst was heated at the temperature indicated in the presence of hydrogen to reduce the iron component. Table 1 shows data on four of the samples including BET surface properties before reduction and H2 chemisorption uptake for an unsupported and three supported FT catalysts prepared in a single mixture reactions in situ.

TABLE 1

| Sample Number (reduction temp) | $AlO_2$ wt % | Surface A. m/g | Pore Vol. $cm^3/g$ | Pore Diam. nm | $H_2$ Uptake μmol/g |
|---|---|---|---|---|---|
| 4 (300° C.) | 10% | 148 | 0.10 | 3.3 | 249 |
| 5 (300° C.) | 80% | 212 | 0.69 | 31 | 388 |

TABLE 1-continued

| Sample Number (reduction temp) | AlO₂ wt % | Surface A. m/g | Pore Vol. cm³/g | Pore Diam. nm | H₂ Uptake μmol/g |
|---|---|---|---|---|---|
| 6 (400° C.) | 80% | 212 | 0.69 | 31 | 588 |
| 7 (500° C.) | 80% | 212 | 0.69 | 31 | 321 |

Because of the high H2 uptake (a measurement of the number of surface metal atoms—which is proportional to the number of active catalytic sites), these data suggest that most, if not all, of the iron catalyst is exposed on the surface of both the unsupported and supported samples.

Other additives may be incorporated for optimal catalyst performance. For example, Mn, La, Ba or Ca might be added to control surface basicity. In another embodiment for unsupported Fe catalysts, the textural promoter such as alumina or silica could be added in the form of a hydrated Boehmite alumina gel or silica gel.

In further embodiments, noble metal catalysts supported on a substrate such as alumina (optionally doped with lanthanum or another stabilizer) can be prepared by the process of this invention by employing salts such as palladium nitrate or platinum nitrate in the initial reaction mixture.

Example 1

3 wt % palladium catalyst samples were prepared by the method described herein. The starting materials were aluminum nitrate, lanthanum nitrate (3 wt %), palladium nitrate (3 wt %) and sodium bicarbonate (Ammonium bicarbonate was not used to avoid the well-known complexing of palladium and ammonium ions.) After the initial reaction, the precursor was washed to remove the sodium, then calcined at 350° C. for 1 h. The palladium oxide was reduced at 200° C. in $H_2$. Z-contrast TEM image of the sample is shown in FIG. 1. The lower electron density alumina appears as the somewhat fuzzy mass while noble metal nanoparticles stand out as the bright dots. The crystallite diameters for Pd are estimated to be 1.3±0.2 nm. This corresponds to a very high dispersion (percentage of catalyst atoms exposed to the surface) of 82%. Catalytic activity of the Pd was verified by the formation of water at room temperature from $H_2$ and $O_2$ via mass spectroscopy thus indicating exposure of the Pd on the surface of the alumina.

Example 2

Figure 2:
FIG. 2 is a Z-contrast TEM image of the sample prepared by the method described in Example 2.

A sample was prepared as in Example 1 except 3 wt % platinum was substituted for the palladium. The Z-contrast TEM image of the sample is shown in FIG. 2. The Pt nanoparticles are 1.8±0.4 nm and the dispersion is 60%.

Example 3

A La-doped, alumina supported Fe/Cu/K Fischer-Tropsch catalyst with final composition of 77.0 wt % alumina, 1.2 wt % copper, 2.6 wt % potassium, 17.1 wt % iron and 2.1% lanthanum oxide was synthesized in a single reaction by stirring aluminum isopropoxide (Al[OCH(CH₃)2]₃), La(NO₃)₃.6H₂O and a small amount of water for ~5 min. to initiate the hydrolysis reaction which forms the metal hydroxide/metal oxide hydroxide intermediate (Water serves as a base under these conditions to initiate the reaction, and as a reactant.) then mixing in Fe(NO₃).9H₂O, Cu(NO₃)2.2.5H₂O, KHCO₃, and NH₄HCO₃ (in a stoichiometric amount for reacting with iron, copper, and potassium salts). The reaction reached completion in approximately 10 min. This catalyst precursor was washed 3 times with 2-butyl alcohol, then dried at room temperature overnight followed by drying at 100° C. for 12 h. It was then calcined at 300° C. for 6 h with a ramp rate of 0.5° C./min. The calcined product was La-doped alumina supported ferrihydrite nanoparticles as determined by XRD, with a surface area of 208.9 m²/g, a pore volume of 0.52 cm³/g and a pore diameter of ~38.2 nm. After the sample was reduced by $H_2$ at 500° C., the average iron crystallite diameter was 18.4 nm.

Example 4

A sample was prepared according to the method of Example 3, except the calcination temperature was 400° C. The final product was alumina supported ferrihydrite nanoparticles, with a surface area of 173.3 m²/g, a pore volume of 0.54 cm₃/g and a pore diameter of ~37.9 nm. After the sample was reduced by $H_2$ at 500° C., the average iron crystallite diameter was 15.4 nm.

Example 5

A sample was prepared according to the method of Example 3, except the calcination temperature was 500° C. The final product was alumina supported ferrihydrite nanoparticles, with a surface area of 151.4 m²/g, a pore volume of 0.53 cm³/g and a pore diameter of ~36.5 nm. The average particle size is 28.4 nm after the sample was reduced by $H_2$ at 500° C.

Example 6

A sample was prepared according to the method of Example 3, except the calcination temperature was 600° C. The final product was alumina supported ferrihydrite nanoparticles, with a surface area of 166.4 m²/g, a pore volume of 0.52 cm³/g and a pore diameter of ~35.1 nm. The average particle size was 21.1 nm after the sample was reduced by $H_2$ at 500° C.

Example 7

A sample was prepared according to the method of Example 3, except the calcination temperature was 700° C. The final product was alumina supported ferrihydrite nanoparticles, with a surface area of 129.2 m²/g, a pore volume of 0.49 cm³/g and a pore diameter of ~35.8 nm.

Example 8

A sample was prepared according to the method of Example 3, except the aluminum isoproxide (Al[OCH(CH₃)2]₃), La(NO₃)₃.6H₂O, Fe(NO₃).9H₂O and Cu(NO₃)₂. 2.5H₂O were stirred together. A 50/50 mixture of water and ethanol were added to the mixture to lower the surface energy, then NH₄HCO₃, KHCO₃ were added and mixed to initiate the reaction. The reaction was complete in approximately 10 min. This catalyst precursor was washed with 2-butyl alcohol 3 times, dried at room temperature overnight and dried at 100° C. for 12 h. It was calcined at 400° C. for 2 h with a ramp rate of 0.5° C./min. The final product was La-doped alumina supported ferrihydrite nanoparticles, with a surface area of 220.3 m²/g, a pore volume of 0.65 cm³/g and a pore diameter of ~19.0 nm.

Example 9

A sample was prepared according to the method of Example 8, except the calcination temperature was 700° C.

The final product was alumina supported ferrihydrite nanoparticles, with a surface area of 153.8 m²/g, a pore volume of 0.56 cm³/g and a pore diameter of ~21.1 nm.

Example 10

An alumina texturized Fischer-Tropsch catalyst with final composition of 82.2 wt % iron, 3.8 wt % copper, 3.1 wt % potassium and 10.9 wt % alumina was synthesized by mixing aluminum isoproxide (Al[OCH(CH$_3$)$_2$]$_3$) and H$_2$O for ~5 min., then adding and mixing Fe(NO$_3$).9H$_2$O, Cu(NO$_3$)$_2$.2.5H$_2$O, NH$_4$HCO$_3$ and KHCO$_3$. The reaction was carried out at room temperature and was completed in approximately 10 min. The catalyst precursor was dried at 100° C. for 12 h, then calcined at 300° C. for 6 h. The final product was alumina texturized ferrihydrite nanoparticles, with a surface area of 139.7 m²/g, a pore volume of 0.09 cm³/g and a pore diameter of ~3.0 nm. The average particle size was 38.4 nm after the sample was reduced by H$_2$ at 300° C.

Example 11

A 3 wt % palladium catalyst was prepared on a titania support containing 22 wt % alumina as a stabilizer via a single-mixture method according to the method of this invention. The catalyst was prepared by mixing 2.85 mL of TiCl$_4$, 2.76 g of Al(NO$_3$)$_3$.9H$_2$O, 0.17 g Pd(NO$_3$)$_2$.XH2O 10.65 g HN$_4$HCO$_3$ and 24 mL H$_2$O for 5 minutes followed by drying for 20 hours at 100° C. Half of the dried sample was washed with 2 L of distilled water to remove the chloride ions and calcined at 400° C. for 3 hours, and the second half was calcined at 400° C. for 3 hours and then rinsed with 2 L distilled water. The final product was Pd nanoparticles dispersed on the titania/alumina support in both samples. Hydrogen chemisorptive uptakes measured at 100° C. in the two experiments were 11 and 199 μmoles/g respectively corresponding to average Pd particle sizes of 14 and 0.8 nm respectively. TEM images of the second sample showed a majority of small uniformly dispersed Pd nanoparticles (0.8 nm) with a few much larger (up to ~20 nm) nanoparticles. The chemisorptive uptake of 199 μmoles/g with an estimated Pd crystallite diameter 0.8 nm for the second sample is consistent with the TEM results.

Example 12

Figure 3:
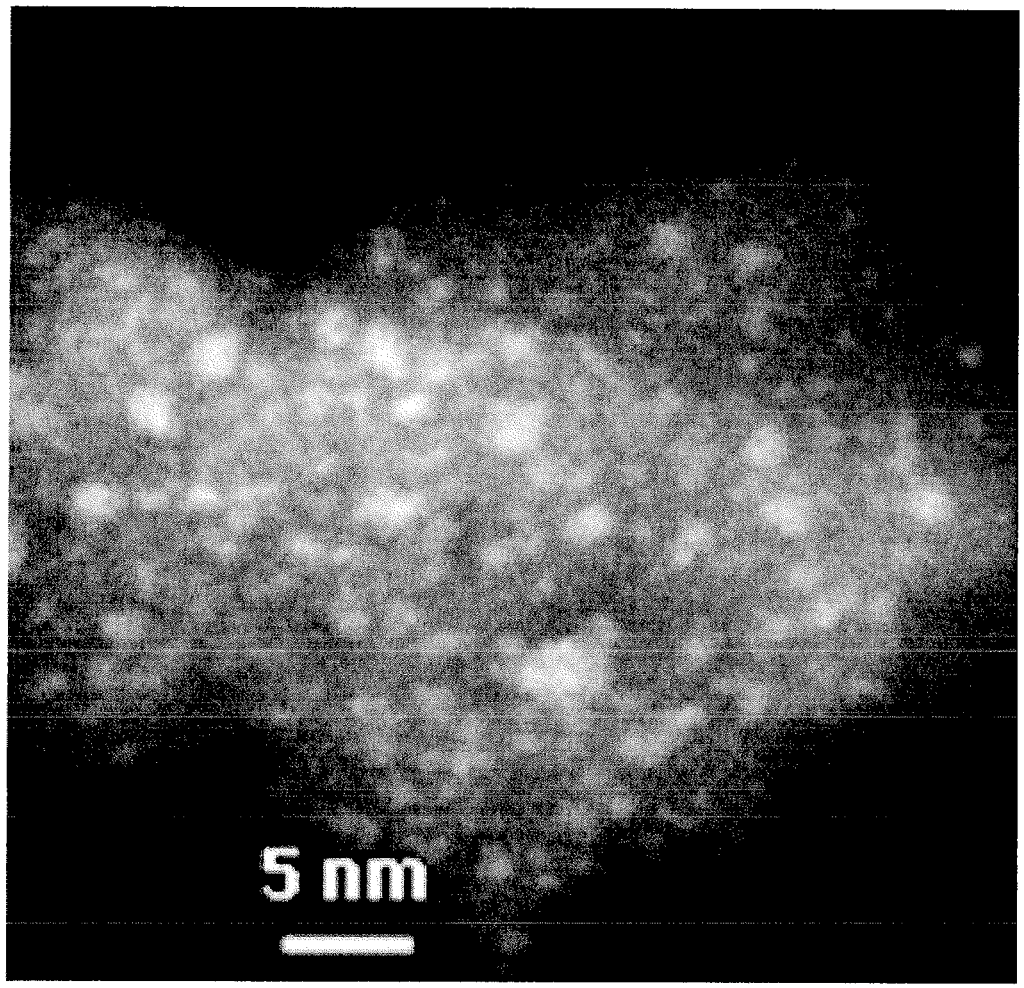
FIG. 3 shows HRTEM images of the sample prepared by the method of Example 12 showing a majority of small finely dispersed Pt nanoparticles.

A 3 wt % platinum catalyst was prepared on a titania support containing 22 mol % alumina as a stabilizer via the subject single-mixture. The catalyst was prepared by mixing 2.86 mL of TiCl$_4$, 2.75 g of Al(NO$_3$)$_3$.9H$_2$O, 0.35 g PtCl$_4$.XH$_2$O, 10.54 g HN$_4$HCO$_3$ and a small amount of water (to facilitate mixing, but mixture was solvent deficient) for 5 minutes followed by drying at room temperature for 3 days. The sample was then rinsed with 400 ml concentrated ammonium hydroxide/distilled water (100 ml: 400 ml) (pH adjusted using ammonium hydroxide) and calcined at 400° C. for 3 hours (ramp rate=1° C./min). The sample was reduced at 250° C. (1° C./min ramp rate) under H$_2$ gas. Hydrogen chemisorptive uptakes measured at 50° C. in two experiments were 1619.9 and 1727.13 μmoles/g corresponding to Pt dispersions of 64% and 67% respectively. HRTEM images of the sample showed a majority of small finely dispersed Pt nanoparticles (FIG. 3).

Example 13

A 3 wt % platinum catalyst on a titania support containing 22 wt % alumina as a stabilizer was prepared as in example 12 except that the TiCl$_4$, Al(NO$_3$)$_3$.9H$_2$O, HN$_4$HCO$_3$ and H$_2$O were mixed for 5 minutes followed by drying at 100° C. for 12 hours. The sample was then rinsed with 2 L distilled water. PtCl$_4$.XH$_2$O along with a small amount of water to facilitate mixing was then added and mixed for 5 minutes. The sample was then calcined at 400° C. for 3 hours to form the titania supported platinum catalyst followed by rinsing with 2 L distilled water and drying at 100° C. for 12 hours. The sample was reduced at 250° C. (1° C./min ramp rate) under H$_2$ gas. Hydrogen chemisorptive uptake was 938.06 iamoles/g, corresponding to a Pt dispersion of 42%.

Example 14

A La-doped, alumina supported Fischer-Tropsch Fe catalyst was synthesized in a single reaction by stirring aluminum isoproxide (Al[OCH(CH$_3$)$_2$]$_3$), La(NO$_3$)$_3$.6H$_2$O and a small amount of water for ~5 min. to initiate the reaction which forms the metal hydroxide/metal oxide hydroxide intermediate (Water serves as a base and a reactant under these conditions to initiate the reaction.) then adding Fe(NO$_3$)$_3$.9H$_2$O, Cu(NO$_3$)$_2$.2.5H$_2$O, KHCO$_3$, NH$_4$HCO$_3$ and mixing. The reaction reached completion in approximately 10 min. This catalyst precursor was washed 3 times with 2-butyl alcohol, then dried at room temperature overnight followed by drying at 100° C. for 12 h. It was then calcined at 300° C. for 6 h with a ramp rate of 0.5° C./min to form the alumina supported catalyst. The final product was La-doped alumina supported ferrihydrite nanoparticles as determined by XRD, with a surface area of 210.9 m²/g, pore volume of 0.64 cm³/g and pore diameter of 25.55 nm. The final composition of calcined sample was 74.39 wt % alumina, 1.30 wt % copper, 0.54 wt % potassium, 22.53 wt % iron (the w % of La was not determined due to a lack of La standard). The H$_2$ uptake of calcined sample determined by hydrogen chemisorption on a Quantachrome analyzer was 203.6 μmol/g and the dispersion was calculated to be ~35.3%. The sample was then reduced at 500° C. for 16 hours in H$_2$ using a temperature program based on a thermogravametric analysis (TGA) of a temperature-programmed reduction (TPR) of an aliquot of the sample. The extent of reduction (EOR) was calculated to be ~33.43%. The reduced sample had a surface area of 128.8 m²/g, a pore volume of 0.54 cm³/g and a pore diameter of 35.07 nm, and the composition of reduced sample was 77.77 wt % alumina, 1.01 wt % copper, 0.59 wt % potassium, and 17.79 wt % iron determined by ICP. Catalytic activity was evaluated in a fixed-bed reactor at 250° C. with a pressure of 21 atmospheres, with a feed H$_2$/CO ratio of 1.0. The rate of reaction based on the total catalyst (iron plus alumina) weight was 5.04 mmol/(gcat·h) (total pressure was 312 psi) and based on the iron content was 44.2 mmol/gFe·h. Selectivity based on the fraction of moles of CO converted to CH$_4$ was 0.132, to C$_2$ was 0.051, to C$_{3+}$ was 0.613 and to CO$_2$ was 0.204.

Example 15

An alumina texturized or unsupported Fischer-Tropsch Fe catalyst with final composition of 82.17 wt % iron, 3.82 wt % copper, 3.11 wt % potassium and 10.91 wt % alumina was synthesized in a single reaction by stirring aluminum isoproxide (Al[OCH(CH$_3$)$_2$]$_3$) and a small amount of water for ~5 min. to initiate the reaction (Water serves as a base and a reactant under these conditions. The mixture is solvent deficient) then mixing with Fe(NO$_3$)$_3$.9H$_2$O, Cu(NO$_3$)$_2$.2.5H$_2$O, KHCO$_3$, and NH$_4$HCO$_3$ (in a stoichiometric amount for reacting with iron, copper, and potassium salts). The reaction reached completion in approximately 10 min. This catalyst precursor was washed 3 times with 2-butyl alcohol, then dried at room temperature overnight followed by drying at 100° C. for 12 h. It was then calcined at 300° C. for 6 h with a ramp rate of 0.5° C./min. The final product was alumina texturized ferrihydrite nanoparticles, with surface area of 139.7 m$^2$/g, pore volume of 0.09 cm$^3$/g and pore diameter of ~3.0 nm. The sample was then reduced at 300° C. for 16 hours in H$_2$ using a temperature program based on a thermogravametric analysis (TGA) of a temperature-programmed reduction (TPR) of an aliquot of the sample. The extent of reduction (EOR) was calculated to be ~16%. The reduced sample had a surface area of 34.8 m$^2$/g, a pore volume of 0.12 cm$^3$/g and a pore diameter of ~12.34 nm. The average particle size was 38.4 nm after the sample was reduced by H$_2$ at 300° C. The H$_2$ uptake of the reduced sample determined by hydrogen chemisorption on a Quantachrome analyzer was 248.8 μmol/g and the dispersion was calculated to be ~20.6%. Catalytic activity was evaluated in a fixed-bed reactor at 250° C. with a pressure of 21 atmospheres, with a feed H$_2$/CO ratio of 1.0. The rate of reaction based on total catalyst weight was 17.1 mmol/(gcat·h) (total pressure was 312 psi) and based on iron was 33.9 mmol/gFe·h. Selectivity based on the fraction of moles of CO converted to CH$_4$ was 0.061, to C$_2$ was 0.166, to C$_{3+}$ was 0.470 and to CO$_2$ was 0.303.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A single-mixture mix and bake method for preparing a texturally promoted catalyst system, comprising:
    mixing at least one catalyst metal salt and at least one textural promoter metal salt with a base to form a solvent deficient precursor mixture;
    allowing the catalyst metal salt, textural promoter metal salt and the base to react in the solvent deficient precursor mixture to form a precursor catalyst intermediate nanoparticle material; and
    heating the intermediate material to yield a stable highly porous textural promoter metal oxide having a textural promoter pore structure phase and a metal catalyst phase on the surface of the pore structure;
    wherein the textural promoter metal oxide has a mean pore diameter of from about 1 nm - 55 nm.

2. A method as in claim 1, wherein the molar ratio of catalyst metal salt to textural promoter metal salt is in a range from about 1:2 to 1:100.

3. A method as in claim 1, wherein both the mean diameter and surface area of the metal oxide catalyst are lower by at least a factor of 1.5 to 10 than the mean pore diameter and surface area of the textural promoter metal oxide material.

4. A method as in claim 1, wherein the heating is carried out at a temperature equal to or greater than about 250° C. for a period of at least about 30 minutes, to 1 day and for which the temperature ramp may vary from 0.05 to 10.

5. A method of claim 1 wherein the metal oxide textural promoter has a mean pore diameter of about 1 to 40 nm. including 3 to 4 nm for noble metals catalysts and 10 to 30 nm for Fischer-Tropsch catalysts.

6. A method as in claim 1, wherein the anion of the textural promoter metal salt is selected to produce a desired pore size in the pore structure.

7. A method as in claim 1, wherein the water in the solvent deficient precursor mixture forms a slurry with the metal salts.

8. A method as in claim 7, wherein the water is included with an aluminum alkoxide in a molar ratio of water: alkoxide in a range from about 1:1 to 1:10.

9. A method as in claim 1, further comprising including an additive that increases the thermal or hydrothermal stability of the textural promoter metal oxide, wherein the concentration of the additive in the precursor mixture is in a range from 1% to 40% by weight and is present in the final catalyst in the range from 0.5% to 40% by weight.

10. A method as in claim 9, wherein the textural promoter, and/or stabilizing additive is/are selected from the group consisting of Al, Si, Ti, Zr, Ca, Ba, Mg, Mn, Cu, Zn, Ce, La, oxides thereof, and combinations thereof.

11. A method as in claim 1 further comprising addition of a salt to the reaction mixture of a metal selected from the group consisting of Na, K, Cs, Ba, Mn, La, Ce, Cu, Ag, Au, Pd, Pt, Re Ni, and Rh.

12. A method as in claim 1, wherein the pore diameter of the textural promoter metal oxide material is in a range from 2-50 nm and the distribution of the pore diameter is in a range of ±10% to ±200% of the average pore diameter.

13. A method as in claim 1, wherein the pore structure of the textural promoter metal oxide material has a BET surface area in a range from 50 m$^2$/g to 800 m$^2$/g; and/or a pore diameter in a range from 2 nm to 50 nm. and wherein the pore volume of the textural promoter metal oxide is in a range from 0.5-1.8 cm$^3$/g.

14. A method as in claim 1, wherein the textural promoter metal salt includes an aluminum salt and the resulting stable metal oxide textural promoter material includes γ-alumina stabilized by one or more additives.

15. A method as in claim 1, wherein the textural promoter metal salt includes a titanium metal salt and the resulting stable metal oxide textural promoter includes primarily titania in the rutile or anatase phase.

16. The method of claim 1 wherein the metal catalyst material includes an iron salt, a copper salt and a potassium salt and the textural promoter salt is from the group consisting of an aluminum salt, a titanium salt and combinations thereof.

17. The method of claim 16 wherein the iron salt includes Fe(NO$_3$)$_3$·xH$_2$O, the copper salt includes Cu(NO$_3$)$_3$·xH$_2$O, the potassium salt includes KHCO$_3$ and the base includes NH$_4$HCO$_3$.

18. A method of claim 1 wherein water present in the solvent deficient mixture is at least in part provided by a metal salt hydrate.

19. A method of claim 2 wherein the molar ratio of catalyst metal salt to textural promoter metal salt is in a range from about 1:4 to 1:33.

20. A method of claim 3 wherein the textural promoter has mean pore diameters of 3-4 nm where noble metal catalyst nanoparticles are 1-2 nm in diameter and the textural promoter has mean pore diameters of 10-30 nm with Fischer-Tropsch catalyst nanoparticles of 6-10 nm diameter.

21. A method of claim 1 wherein the catalyst metal salt includes a cobalt salt in combination with Pt, Ru, and/or Pd salts and the textural promoter metal salt is from the group consisting of an aluminum salt, a titanium salt and combinations thereof.

* * * * *

UNITED STATES PATENT AND TRADEMARK OFFICE
CERTIFICATE OF CORRECTION

| | |
|---|---|
| PATENT NO. | : 9,079,164 B2 |
| APPLICATION NO. | : 13/836985 |
| DATED | : July 14, 2015 |
| INVENTOR(S) | : Woodfield et al. |

Page 1 of 2

It is certified that error appears in the above-identified patent and that said Letters Patent is hereby corrected as shown below:

IN THE SPECIFICATION

Column 2
Line 65, change "be ions" to --base ions--

Column 3
Line 20, change "be generally be" to --generally be--

Column 4
Line 59, change "CO/H2" to --CO/$H_2$--
Line 60, change "H2S/H2" to --$H_2$S/$H_2$--

Column 5
Line 26-27, remove "iron nitrate,…,iron chloride"
Line 34, remove "manganese nitrate, manganese chloride"

Column 8
Line 7, change "V5+" to --$V^{5+}$--
Line 10, change "V5+ to V4+" to --$V^{5+}$ to $V^{4+}$--
Line 61, change "catalysts," to --catalysts,)--

Column 9
Line 54, change "largemesopore" to --large mesopore--

Column 10
Line 21, change "Fe(NO)3" to --Fe(NO)$_3$--
Line 22, change "Cu(NO3)2 and KHCO3" to --Cu(NO$_3$)$_2$ and KHCO$_3$--
Line 56, change "H2" to --$H_2$--

Signed and Sealed this
First Day of March, 2016

Michelle K. Lee
*Director of the United States Patent and Trademark Office*

Column 11
Line 9, change "H2" to --$H_2$--
Line 60, change "Al[OCH(CH$_3$)2]$_3$" to --Al[OCH(CH$_3$)$_2$]$_3$--
Line 65, change "Cu(NO$_3$)2.2.5H$_2$O" to --Cu(NO$_3$)$_2$.2.5H$_2$O--

Column 12
Line 50, change "Al[OCH(CH$_3$)2]$_3$" to --Al[OCH(CH$_3$)$_2$]$_3$--

Column 13
Line 27, change ".XH2O" to --.XH$_2$O--

Column 14
Line 10, change "iamoles/g" to --µmoles/g--
Line 31, change "of calcined" to --of the calcined--
Line 53, change "C$_{3+}$" to --C$^{3+}$--

Column 15
Line 23, change "C$_{3+}$" to --C$^{3+}$--